United States Patent [19]
Kobayashi et al.

[11] Patent Number: 6,139,948
[45] Date of Patent: Oct. 31, 2000

[54] COATED ALIPHATIC POLYESTER FILM

[75] Inventors: Naoki Kobayashi; Shuhei Ikado; Akira Kawano; Takayuki Kuroki; Hirotaka Wanibe, all of Aichi-ken, Japan

[73] Assignee: Mitsui Chemicals, Inc., Japan

[21] Appl. No.: 09/198,329

[22] Filed: Nov. 24, 1998

Related U.S. Application Data

[62] Division of application No. 08/832,676, Apr. 9, 1997, Pat. No. 5,914,188.

[30] Foreign Application Priority Data

| Apr. 18, 1996 | [JP] | Japan | ................................. 8-096616 |
| Apr. 25, 1996 | [JP] | Japan | ................................. 8-105125 |

[51] Int. Cl.⁷ ............................... B32B 5/16; B32B 27/36
[52] U.S. Cl. ...................... 428/331; 428/336; 428/340; 428/341; 428/480; 428/910
[58] Field of Search ................................. 428/331, 336, 428/340, 341, 412, 423.7, 480, 482, 483, 910

[56] References Cited

U.S. PATENT DOCUMENTS

| 5,013,601 | 5/1991 | Bothe et al. ........................... 428/323 |
| 5,281,472 | 1/1994 | Takahashi et al. ..................... 428/336 |
| 5,310,865 | 5/1994 | Enomoto et al. ....................... 528/361 |
| 5,401,796 | 3/1995 | Kashima et al. ........................ 524/706 |

FOREIGN PATENT DOCUMENTS

| 0271799    | 6/1988  | European Pat. Off. . |
| 0683207 A2 | 11/1995 | European Pat. Off. . |
| 0732341    | 9/1996  | European Pat. Off. . |
| 61-53038   | 3/1986  | Japan . |
| WO94/13477 | 6/1994  | WIPO . |
| WO94/24198 | 10/1994 | WIPO . |

*Primary Examiner*—D. S. Nakarani
*Attorney, Agent, or Firm*—Burns, Doane, Swecker, & Mathis, L.L.P.

[57] ABSTRACT

A membrane formed by coating an aqueous coating liquid comprising an antistatic agent or anticlouding agent on one or both surfaces of an aliphatic polyester film comprising a specific amount of a lubricant or an antiblocking agent, can remarkably improve adhesion of the membrane (antistatic layer or anticlouding layer) to the aliphatic polyester film, and thus the effect of the membrane (antistatic effect or anticlouding effect) can be continuously exhibited for a long period.

6 Claims, No Drawings

6,139,948

COATED ALIPHATIC POLYESTER FILM

This application is a divisional, of application Ser. No. 08/832,676, filed Apr. 9, 1997 now U.S. Pat. No. 5,914,188.

BACKGROUND OF THE INVENTION

1) Filed of the Invention

The present invention relates to a coated aliphatic polyester film having a membrane formed by coating an aqueous coating liquid. More specifically, the invention relates to a coated aliphatic polyester film which is degradable in the natural environment, has good blocking resistance and is excellent in the durability of membrane effect due to small coefficient of variation in the membrane thickness. Still more specifically, the invention relates to a non-charged aliphatic polyester film or a anticlouding aliphatic polyester film wherein the membrane is an antistatic layer or anticlouding layer, and the effects of these layers are immediately exhibited and have excellent durability.

2) Description of Related Art

The problem of waste plastics has received focused attention in recent years. Conventionally, wrapping materials prepared from general purpose resins and waste plastics such as agricultural films were discarded after use and disposed by incineration or landfilling. However, these plastic wastes develop high combustion heat in the incineration disposal, and has led to problems on the durability of the incinerator and on the public health due to generation of a toxic gas by incineration of plastics such as polyvinyl chloride. Further, when the waste plastics are used for land filling, plastic molded articles do not decompose as intact, semipermanently remain in the soil while holding their original shape as refuse. Consequently, the effect of waste plastics on the natural environment has become a serious problem.

In such environment, various degradable plastics which are composed of aliphatic polyester and can be completely decomposed under natural environment to the level of natural by-products, carbon dioxide and water, have been found and are now in the practical application step.

There are attempts to use these degradable aliphatic polyesters in the form of films or sheets according to its mechanical strength, transparency and flexibility to various uses such as wrapping materials, magnetic recording materials, optical materials and general materials in industry.

In the aliphatic polyester, a lactic acid based polymer film which has lactic acid units in the molecular structure has no generation of fungi and transparency can be maintained. Thus, it is expected to be used for an external and internal cover of agricultural facilities, tunnel house films, multi-cultivation films and other agricultural films.

However, the aliphatic polyester films have disadvantage of high electrical insulation and tend to be electrostatically charged with ease. As a result, the operator has received an electric shock at the winding or slitting the film, running of the film has become unstable at the printing or other fabrication step, sticking has remarkably lowered workability and further, spark discharge has sometimes led to an ignition accident. When they are used as a product, adhesion of refuse or dust has also caused problem. Consequently, aliphatic polyester films have been desired to provide antistatic properties.

Generally, plastic films are provided with antistatic property by incorporating an antistatic agent such as a surface active agent into the resin.

The present inventors have applied the process to an aliphatic polyester film and obtained following results. Some kinds of antistatic agents can provide antistatic property. However, (1) because the antistatic effect is low, a large amount of incorporation is required and leads to reduction of mechanical strength of the film. (2) The antistatic agent is difficult to bleed to the film surface and a significant time is needed before emergence of the antistatic effect. (3) Durability of the antistatic effect is short. Due to the above and other additional problems, plastic films are still unsatisfactory as an industrial product.

Conventionally, cultivation of vegetables are carried out in a house of synthetic resin film such as polyvinyl chloride, polyethylene, and ethylene vinyl-acetate copolymer, in order to cultivate even in a low temperature season. In such case, the synthetic resin film is always required to transmit sunlight. Accordingly, development of cloudiness due to moisture on the surface of the synthetic resin film must be inhibited. A process for previously incorporating an anticlouding agent into the resin and a process for forming a membrane of the anticlouding agent on the surface of the film have been tried.

For example, Japanese Laid-Open Patent Sho 61-53038 has disclosed an agricultural polyethylene terephthalate film which has an anticlouding film layer on the surface of the agricultural polyethylene terephthalate film. However the agricultural polyethylene terephthalate film is insufficiently adhered to the anticlouding film layer. When used for a long time, the layer is peeled, separated and thus the effect cannot be maintained for a long time.

SUMMARY OF THE INVENTION

One object of the invention is to provide a coated aliphatic polyester film which is degradable in the natural environment, has good anti-blocking property and is excellent in the durability of membrane effect.

As a result of an intensive investigation in consideration of the above subjects, the present inventors have found that thickness uniformity of the membrane and adhesion of the membrane to the aliphatic polyester film can be remarkably improved when an aqueous coating liquid is coated and the membrane is formed on one or both surfaces of the aliphatic polyester film comprising a specific amount of lubricant or antiblocking agent. As a result, the effect of the membrane was found to be continuously exhibited for a long time, and the invention has been completed.

That is, one aspect of the invention is a coated aliphatic polyester film having a membrane formed by coating an aqueous coating liquid having an antistatic agent or anticlouding agent on one or both surfaces of an aliphatic polyester film composed of an aliphatic polyester resin composition comprising 0.1–2 parts by weight of one or more kinds of additives selected from the group consisting of lubricant and antiblocking agent for 100 parts by weight of aliphatic polyester.

Further, the invention includes a non-charged aliphatic polyester film where the membrane is an antistatic layer.

Further, the invention includes an anticlouding aliphatic polyester film wherein the membrane is an anticlouding layer formed by a composition having an inorganic colloid sol and binder as principal components, particularly anticlouding agricultural lactic acid based polymer film.

The coated aliphatic polyester film of the invention has degradability in the natural environment and good block resistance. Thickness of the membrane is uniform and thus is excellent in the durability of membrane effect. For example, non-charged aliphatic polyester film of the invention has excellent antistatic effect and the effect is immediately exhibited. The effect can maintained for a long time.

Anticlouding agricultural lactic acid based polymer film of the invention has an excellent anticlouding effect and adhesion of anticlouding layer to the lactic acid based polymer film can be maintained for a long time. As a result, anticlouding effect can be maintained for a long time.

DETAILED DESCRIPTION OF THE INVENTION

The present invention will hereinafter be illustrated in detail.

The coated aliphatic polyester film of the invention can be prepared by coating an aqueous coating liquid comprising an antistatic agent or anticlouding agent and forming a membrane on one or both sides of an aliphatic polyester film obtained from an aliphatic polyester resin composition comprising 0.1–2 parts by weight of one or more kind of additives selected from the group consisting of lubricant and antiblocking agent for 100 parts by weight of aliphatic polyester.

The polymer for constituting the film of the invention is aliphatic polyester. These polymers specifically include (1) polylactic acid and a copolymer of lactic acid with other hydroxycarboxylic acid, (2) aliphatic polyester consisting of lactic acid units, aliphatic polycarboxylic acid units and aliphatic polyhydric alcohol units, (3) aliphatic polyester comprising lactic acid units and polyfunctional polysaccharide, (4) aliphatic polyester composed of aliphatic polycarboxylic acid and aliphatic polyhydric alcohol, and (5) a mixture of the above aliphatic polyesters.

The aliphatic polyester which has lactic acid units in the molecular structure such as the above aliphatic polyesters (1), (2) and (3) and their mixture is called lactic acid-based polymer in the invention. These polyesters are excellent in transparency as compared with polyester (4). On the other hand, polyester (4) is excellent in flexibility.

When the aliphatic polyester of the invention is applied to uses which require transparency, the film preferably has a Haze of less than 2.5% in the thickness for use. Accordingly, when the agricultural polyester film is used for an external cover of a horticultural facility, lactic acid-based polymer is preferred in the aliphatic polyester film, and the amount of the lactic acid units is more preferably 40% by mol or more.

Lactic acid has L-isomer and D-isomer. The term lactic acid in the invention is referred to as L-isomer, D-isomer and a mixture of these compounds unless otherwise noted. The molecular weight of the polymer is referred to as weight average molecular weight unless otherwise noted.

Polylactic acid in the invention is poly(L-lactic acid) where structural units are L-lactic acid alone, poly(D-lactic acid) where structural units are D-lactic acid alone, or poly(DL-lactic acid) where L-lactic acid units and D-lactic acid units are present in an arbitrary ratio. Any type of these polylactic acids can be used in the invention.

Other hydroxycarboxylic acids which can form copolymer by reacting with lactic acid include, for example, glycolic acid, 3-hydroxybutyric acid, 4-hydroxybutyric acid, 4-hydroxyvaleric acid, 5-hydroxyvaleric acid and 6-hydroxycaproic acid.

Polylactic acid used for the invention can be prepared by a direct dehydration polycondensation process of L-lactic acid, D-lactic acid or D,L-lactic acid. The process is disclosed, for example, in U.S. Pat. No. 5,310,865. Polylactic acid can also be prepared by ring opening polymerization of lactide, a cyclic dimer of lactic acid. The ring opening polymerization can also be carried out in the presence of a hydroxy group containing compounds such as higher alcohol and hydroxycarboxylic acid.

A copolymer of lactic acid with other hydroxycarboxylic acid can be prepared by polycondensation process of lactic acid and the above mentioned hydroxycarboxylic acid, for example, the process which is described in U.S. Pat. No. 5,310,865. Further, the copolymer can also be prepared by ring opening copolymerization of lactide, a cyclic dimer of lactic acid, and cyclic compound of the above hydroxycarboxylic acid. Any process can be used. When transparency is required for the polymer, the copolymer preferably includes lactic acid units of 40% by mol or more.

The polyfunctional polysaccharide which can be used for preparing aliphatic polyester which comprises lactic acid units and polyfunctional polysaccharide includes, for example, cellulose, cellulose nitrate, cellulose acetate, methylcellulose, ethylcellulose, CMC, nitrocellulose, regenerated cellulose such as cellophane, viscose rayon and cupra, hemicellulose, starch, amylopectine, dextrin, dextran, glycogen, pectin, chichin and chitosan and a mixture and derivative of these compounds. Cellulose acetate and ethyl cellulose are particularly preferred in these materials.

The aliphatic polyester which comprises lactic acid units and polyfunctional polysaccharide can be prepared by reaction of the above polyfunctional polysaccharide with lactic acid or polylactic acid, or a copolymer of lactic acid with other hydroxycarboxylic acid. For example, the process of EP 0732341 A2 can be used for the preparation.

The above polyfunctional polysaccharide can react with lactide, cyclic dimer of lactic acid, or with cyclic ester of the above hydroxycarboxylic acid to prepare these polyester. Any process can be used for the preparation. When transparency is required for the polymer obtained, the amount of the lactic acid units included in the aliphatic polyester is preferably 50% by mol or more.

Aliphatic polycarboxylic acids which can be used for the preparation of aliphatic polyester comprising lactic acid units, aliphatic polycarboxylic acid units and aliphatic polyhydric alcohol units or for the preparation of aliphatic polyester composed of aliphatic polycarboxylic acid and aliphatic polyhydric alcohol, includes, for example, oxalic acid, succinic acid, malonic acid, glutaric acid, adipic acid, pimelic acid, suberic acid, azelaic acid, undecanoic diacid, dodecanoic diacid and anhydrides of these acids. These acids can be anhydrides or mixture of anhydrides.

Aliphatic polyhydric alcohols which can be used include, for example, ethylene glycol, diethylene glycol, triethylene glycol, propylene glycol, dipropylene glycol, 1,3-butanediol, 1,4-butanediol, 3-methyl-1,5-pentanediol, 1,6-hexanediol, 1,9-nonanediol, neopentyl glycol, tetramethylene glycol and 1,4-cyclohexanedimethanol.

Aliphatic polyester comprised of lactic acid units, aliphatic polycarboxylic acid units, and aliphatic polyhydric alcohol units can be prepared by reacting the above aliphatic polycarboxylic acid and the above aliphatic polyhydric alcohol with polylactic acid or a copolymer of lactic acid and other hydroxycarboxylic acid, or by reacting the above aliphatic polycarboxylic acid and above aliphatic polyhydric alcohol with lactic acid, for example, U.S. Pat. No. 5,401, 796. Further, reaction of the above aliphatic polycarboxylic acid and the above aliphatic polyhydric alcohol with lactide, cyclic dimer of lactic acid, and cyclic ester of the above hydroxycarboxylic acid can also be used. Any preparation process can be applied. When transparency is required for the polymer obtained, the aliphatic polyester preferably includes lactic acid units of 50% by mol or more.

Aliphatic polyester composed of aliphatic polycarboxylic acid and aliphatic polyhydric alcohol can be prepared by reacting the above aliphatic polycarboxylic acid with the above aliphatic polyhydric alcohol, for example, U.S. Pat. No. 5,401,796.

Molecular weight of aliphatic polyester influences processability of film, strength of film obtained and degradability of film. Low molecular weight decreases film strength and the film sometimes breaks due to tension in use and degradation is accelerated. On the other hand, high molecular weight decreases processability and film forming becomes difficult. In view of these subjects, the molecular weight of the aliphatic polyester of the invention is preferably in the range of 10,000–1,000,000, more preferably in the range of 100,000–300,000.

The optimum molecular weight and copolymer composition of aliphatic polyester which can be used for the aliphatic polyester film of the invention are determined so as to obtain the longest life in the field of use in view of the hydrolysis date of known aliphatic polyester film.

In order to improve durability of the membrane effect formed by coating the aqueous coating liquid in the invention, one or more kinds of additive selected from the group consisting of lubricant and antiknocking agent is required to incorporate with the aliphatic polyester.

Lubricants which can be used include, for example, liquid paraffin, microcrystalline wax, natural paraffin, synthetic paraffin, polyethylene and other aliphatic hydrocarbon lubricants; stearic acid, lauric acid, hydroxystearic acid, hardened castor oil and other fatty acid-based lubricants; stearic acid amide, oleic acid amide, erucic acid amide, lauric acid amide, palmitic acid amide, behenic acid amide, ricinoleic acid amide, oxystearic acid amide, methylenebisstearic acid amide, ethylenebisstearic acid amide, ethylenebisoleic acid amide, ethylenebisbehenic acid amide, ethylenebislauric acid amide and other fatty acid amide based lubricants; lead stearate, calcium stearate, calcium hydroxystearate and other metal soap lubricants which are fatty acid metal salts having 12–30 carbon atoms; glycerol fatty acid ester, hydroxystearic acid triglyceride, sorbitan fatty acid ester and other polyhydric alcohol-fatty acid (partial) ester based lubricants; long chain ester waxes such as butyl stearate and montan wax and other fatty acid ester based lubricants; and complex lubricants obtained by combination of these lubricants.

In view of continuous adhesion of membrane for a long service life, fatty acid based lubricants, fatty acid amide based lubricants and fatty acid ester based lubricants are preferred.

Exemplary antiblocking agents which can be used include silica, calcium carbonate, titania, mica and talc. Silica having an average particle size of 7–50 nm is preferably used in view of processing ability and transparency of the film. When the average particle size is smaller than 7 nm, particles are liable to coagulate and workability becomes poor. When the average particle size exceeds 50 nm, appearance of the film becomes turbid. Silica is preferably include 95% by weight or more of $SiO_2$. Presence of anhydrous silica is more preferred.

Amount of the lubricant, antiblocking agent or a mixture of these additives is preferably 0.1–2 parts by weight for 100 parts by weight of aliphatic polyester. When the amount is less than 0.1 part by weight, the effect of the membrane formed by the coater has low durability and uniformity of membrane thickness is not so improved. On the other hand, the amount exceeding 2 parts by weight lowers thickness accuracy of the film obtained. As a result, the membrane has no uniformity in thickness and durability of membrane effect is reduced.

Addition and mixing of lubricants and antiblocking agents to aliphatic polyester is carried out by ribbon blender, Henschel mixer and other blending machines. Aliphatic polyester is dissolved in chloroform or other solvents, or aliphatic polyester is melted by heating to 100–280° C. and prescribed amount of lubricants and antiblocking agent are added and mixed.

Plasticizers, UV absorbers, antioxidants, light stabilizers, heat stabilizers, fillers, antifogging agents, color stabilizers and colorants can be added, so long as giving no adverse effect on the object of the invention.

No particular restriction is imposed upon the process for preparing aliphatic polyester film from the resin composition thus obtained. Known processes can be used. For example, melt-casting process uses chloroform, methylene chloride, benzene, toluene, xylene, dimethylformamide and dimethylimidazolidinone as solvents. The solution of polyester thus obtained is cast on a flat plate and then solvents are removed from the solution.

In the case of melt-extrusion process, known T-die method and inflation method are applied. A T-die mounted extruder is used, and the above aliphatic polyester resin composition is kneaded, melted, extruded and cooled on a casting roll to obtain an unstretched film. Extrusion temperature is preferably in the range of 100–280° C., more preferably 130–250° C. When the temperature is low, forming stability is difficult to occur and overload is liable to obtain. On the other hand, when the temperature is high, aliphatic polyester tends to decompose and unfavorably leads to molecular weight reduction, strength reduction, and coloration.

In the preparation of biaxially stretched film, for example, an unstretched film is longitudinally stretched by a roll stretching process and then stretched to the cross direction with a tenter. Other than such successive biaxial stretching method, simultaneous biaxial stretching method by using a tenter and tubular biaxial stretching method can also be carried out. Successive stretching process is preferred in view of uniformity, thickness accuracy and productivity.

For example, successive biaxial stretching process is carried out as described below by using rolls or a tenter. Aliphatic polyester is heat treated at 50–130° C., and subjected to drying and crystallization. Successively, polyester is kneaded and melt-extruded with a T-die mounted extruder at 130–250° C., and quenched on a casting roll at 60° C. or less to form a film. An air knife or electrostatic charging equipment is preferably used in order to adhere the molten film to a roll and to make the film surface flat. Successively unstretched film thus obtained is taken on a wind up machine, longitudinally stretched 1.3–5 times, preferably 2–4 times at 30–80° C. The cross stretching ratio is 1.3–5 times, preferably 2–4 times at 40–80° C. When heat resistance (resistance to heat shrinkage) is required for the film, the stretched film is preferably heat-set in the tenter under tension at 80–150° C. for 3–120 seconds.

When a film having an excellent mechanical strength or durability is desired, biaxial stretching is preferably carried out. When the stretching ratio is individually less than 1.3 to both longitudinal and cross directions, mechanical strength and durability of the film are unsatisfactory. On the other hand, a stretching ratio exceeding 5 times unfavorably breaks the film. Stretching temperature outside of the above range unfavorably leads to no stretching and film break at lower temperature and to crystallization, irregular stretching and film break at higher temperature.

Thus obtained stretched and unstretched aliphatic polyester films which comprises lubricants or antiblocking agent are characterized by uniformity of film thickness. In order to provide antistatic property or anticlouding property for these films, an aqueous coating liquid comprising antistatic agent or anticlouding agent is applied to one or both surfaces of the films to form a uniform membrane.

Antistatic agents which are be used for providing antistatic property for these films include, for example, ion conducting compounds such as anion type, cation type, nonion type, betaine type, acrylic polymers having quarternary ammonium group, ion polymers, phosphate compounds and phosphate ester compounds; tin oxide, antimony oxide and other metal oxides; alkoxy silane, alkoxy titanium, alkoxy zirconium and other metal alkoxides and derivatives thereof; and coated carbon and coated silica. These additives can be used singly or as a mixture.

Anion type antistatic agents which can be used include, for example, fatty acid salts, sulfated oil, sulfated ester oil, sulfated amide oil, sulfated ester salts of olefin, sulfate ester salts of aliphatic alcohol, alkyl sulfate ester salts, fatty acid ethyl sulfonic acid ester salts, alkyl sulfonates, alkylnaphthalene sulfonates and alkylbenzenesulfonates.

Cation type antistatic agent includes, for example, aliphatic amine salts, quaternary amine salts and alkylpyridinium salts.

Representative nonion type antistatic agents include, for example, fatty acid partial ester of polyhydric alcohols such as sorbitan and pentaerythritol, ethylene oxide adducts thereof, ethylene oxide adducts of aliphatic alcohol, ethylene oxide adducts of fatty acid, ethylene oxide adducts of alkyl phenol, and ethylene oxide adducts of polyethylene glycol, alkylamine and fatty acid amide.

Betaine type antistatic agents include, for example, alkylamino-carboxylic acid betaine compounds and imidazoline derivatives.

The aqueous coating liquid comprising these antistatic agent is applied in the presence of auxiliary coating agents. These auxiliary agents are methanol, ethanol, isopropanol and other water soluble agents. The amount of these agents is 1–20 parts by weight. The antistatic agents are dissolved or dispersed in the mixture of water and auxiliary agents. The concentration of antistatic agent is 0.01–40% by weight, preferably 0.05–20% by weight. When necessary, surface active agent, UV absorber, pigment, organic filler, inorganic filler, lubricant and antiblocking agent can be added to the aqueous coating liquid.

Anticlouding agents which are used for providing anticlouding property for the film consist of inorganic colloid sol and binder. Inorganic colloid sol is an aqueous sol, and can be obtained, for example, by dispersing silica, alumina, water insoluble lithium silicate, iron hydroxide, tin hydroxide, titanium oxide, barium sulfate and other inorganic aqueous colloidal particles in water or an aqueous medium. Silica sol and alumina sol are preferred in these sols. These sols can be used singly or as a mixture.

Inorganic colloid sol has preferably an average particle size of 0.005–0.1 $\mu$m. Two or more colloid sols having difference in average particle sizes can be used as a mixture. The average particle size exceeding 0.1 $\mu$m is unfavorable in view of appearance, transparency in particular. The average particle size less than 0.005 $\mu$m is also unfavorable because of unstable composition.

Thermoplastic resin which can be used for a binder component includes, for example, acrylic based resin, vinyl chloride-vinyl acetate based resin, polyethylene based resin, vinyl chloride based resin, vinylidene chloride based resin, polyurethane based resin, polycarbonate based resin, styrene based resin, vinyl acetate based resin, and unsaturated polyester based resin. Acrylic based resin is preferred in these resins. These resins are usually used in the form of an aqueous emulsion in order to increase affinity of these resins and water or aqueous medium.

In order to form an anticlouding membrane on one surface of the aliphatic polyester film, the above inorganic colloid sol and the binder component are dispersed in water or an aqueous medium to prepare an aqueous coating liquid. The aqueous coating liquid thus prepared is coated on one surface of the aliphatic polyester film and the medium is evaporated. The amount of inorganic colloid sol in the aqueous coating liquid is preferably 1–40% by weight. When the amount is less than 1% by weight, anticlouding property is insufficient. On the other hand, the amount exceeding 40% by weight leads to unfavorably too high viscosity. The binder ingredient used for forming an anticlouding membrane in the aqueous coating liquid is preferably 0.05–15% by weight of the aqueous coating liquid. When the amount of the binder in the aqueous coating liquid is less than 0.05% by weight, dispersion stability of the aqueous coating liquid becomes poor and anticlouding property does not improve after coating. On the other hand, when the amount exceeds 15% by weight, dispersion of the aqueous coating liquid becomes poor, viscosity becomes high, and thus flow ability becomes poor and durability of anticlouding property is unfavorably reduced.

In order to assist dispersion of inorganic colloid sol, a small amount of univalent inorganic or organic acid can be added to the aqueous coating liquid comprising anticlouding agent.

In order to improve water resistance of the membrane, a crosslinking compound for bonding binder components to each other can be simultaneously used. Deforming agent, lubricant, and antistatic agent can be added, when necessary.

Next, it is illustrated at detail that the antistatic layer or anticlouding layer is formed on one surface or on both surfaces of the aliphatic polyester film. The antistatic layer or anticlouding layer is formed by coating and drying the aqueous coating liquid which comprises the above antistatic agent or anticlouding agent on one surface or both surfaces of the aliphatic polyester film.

Application of the aqueous coating liquid can be carried out by known processes. That is, spray coating method, air knife method, reverse coating method, kiss coating method, gravure coating method, metering bar method, roll brushing method, dip coating method, calender coating method, squeeze coating method and fountain coating method can be applied.

For example, an unstretched film is formed by a T-die mounted extruder. The aqueous coating liquid is coated on the unstretched film and the film is dried in a drying oven. Drying by direct blowing to the film can also be carried out. Crystallization and whitening are liable to occur depending upon the drying temperature after coating. Thus film temperature is preferably maintained at 80° C. or less.

Uniaxially stretched coating film is prepared by coating the aqueous coating liquid on the unstretched film, uniaxially stretching the film, and drying similar to the unstretched film.

Biaxially stretched coating film is prepared by various methods. The aqueous coating liquid is coated on the unstretched film and stretching is carried out successively or simultaneously. In another method, the aqueous coating liquid is coated on the longitudinally stretched film and the film is successively stretched to the cross direction. In other method, the aqueous coating liquid is coated on a biaxially stretched film and further stretching is carried out laterally and/or longitudinally.

In another preferred method, longitudinally stretched film is prepared by roll stretching method. The aqueous coating liquid is coated on the roll stretched film and dried at 40–80° C., or drying is omitted, and the film is immediately stretched laterally and subjected to heat treatment under the above conditions. When the aqueous coating liquid is applied and drying is omitted, drying is carried out simultaneously with heat treatment after biaxial stretching. In the process, preheating and drying of the film can be carried out in the lateral stretching tenter. Thus the method is advantageous in view of energy saving.

In order to improve coating ability of the coating liquid to the film and adhesion of the membrane to the film, film surface can be activated by carrying out corona discharge, UV irradiation and plasma treatment before coating with the aqueous coating liquid.

The thickness of membrane formed on one surface or both surfaces of the aliphatic polyester film is preferably in the range of 0.01–5 μm (0.01–5 g/m² as weight of solid), more preferably in the range of 0.05–1 μm(0.05–1 g/m² as weight of solid). When the membrane has a thickness of less than 0.01 μm (0.01 g/m² as weight of solid), uniform membrane cannot be formed, irregular thickness is liable to occur and the object of the invention, that is, uniformity of the effect becomes difficult to obtain. When the membrane has thickness exceeding 5 μm (5 g/m² as weight of solid), the film is liable to block and the durability effect of the membrane adhesion cannot be exhibited.

The coated aliphatic polyester film prepared as above in the invention has a thickness of usually 0.01–2 mm. The thickness is arbitrarily selected on the basis of use.

The coated aliphatic polyester film thus obtained in the invention has an extremely uniform thickness of membrane. The uniformity of thickness in the membrane is measured by the method described in the examples and indicated by the coefficient of variation in the membrane thickness. The coefficient of thickness variation in the membrane obtained by the process of the invention is 130% or less. The coefficient of thickness variation exceeding 130% is unfavorable in view of durability of membrane effect.

The antistatic aliphatic polyester film having an antistatic layer in the form of membrane thus obtained can be degraded in the natural environment and additionally has good blocking resistance, and is excellent in the antistatic effect, and the effect has immediate effect, durability and uniformity. Consequently, the film can be used for wrapping materials, magnetic recording materials, optical materials, magnetic recording materials, electric insulation materials, general industrial materials and other various uses. Even though abandoned after use in the natural environment, the film relatively quickly degrades and thus does not accumulate in the form of waste.

The anticlouding lactic acid based polymer film is excellent in the durability of adhesion between anticlouding membrane and lactic acid based polymer film and thus has an excellent durability of anticlouding property. And its impact resistance, elongation and other usually mechanical properties, hydrolyzability under natural environment, and degradability by enzyme are almost equal to the conventional lactic acid based polymer film. Even though disposed after use, the film does not accumulate in the natural environment. Consequently, the film is very useful as an agricultural film for house covering in horticultural facility and tunnel house.

When the coated aliphatic polyester film of the invention is used outdoors, particularly as an agricultural film of the outer wall of an horticultural facility house, it is preferred to add UV-absorbers or light stabilizers to the aliphatic polyester resin composition which comprises lubricants or antiblocking agents. UV absorbers absorb UV-beams of 250–380 nm in the wave lengths which have a high destructive energy and reirradiate the beams after converting to nondestructive wave lengths. Light stabilizers do not always absorb UV-beams, decompose hydroperoxide light degradation initiators to non-radicals, or catch and remove radicals generated by light decomposition, to reduce light decomposition of the materials on the bases of some mechanism.

UV-absorbers and light stabilizers which can be used in the invention include, for example, phenyl salicylate, p-tert-butylphenyl salicylate and other salicylate derivatives; 2,4-dihydroxybenzophenone, 2-hydroxy-4-methoxybenzophenone, 2,2'-dihydroxy-4-methoxybenzophenone, 2,2'-dihydroxy-4,4'-dimethoxybenzophenone, 2-hydroxy-4-methoxy-2'-carboxybenzophenone, 2-hydroxy-4-n-octoxybenzophenone, 2,2',4,4'-tetrahydroxybenzophenone, 4-dodecyloxy-2-hydroxybenzophenone, bis(5-benzoyl-4-hydroxy-2-methoxyphenyl)methane and other benzophenone derivatives; 2-(2'-hydroxy-5'-methylphenyl) benzotriazole, 2-(2'-hydroxy-3',5'-di-tert-butylphenyl) benzotriazole, 2-(2'-hydroxy-3'-tert-butyl-5'-methylphenyl)-5-chlorobenzotriazole, 2-(2'-hydroxy-3',5'-di-tert-butylphenyl)-5-chlorobenzotriazole, 2-(2'-hydroxy-5'-tert-octylphenyl)benzotriazole, 2-(2'-hydroxy-3',5'-di-tert-amylphenyl) benzotriazole, 2-[2'-hydroxy-3'-(3",4",5",6"-tetrahydrophthalimidemethyl)-5'-methylphenyl] benzotriazole, 2,2'-methylenebis[4-(1,1,3,3-tetramethylbutyl-6-(2H-benzotriazol-2-yl)phenol] and other benzotriazole derivatives; oxalic anilide derivatives known as Trade Mark, Sanduvor EPU and Sanduvor VSU; 2-ethoxy-5-tert-butyl-2'-ethyloxalic acid bisanilide, 2-ethoxy-2-ethyl oxalic acid bisanilide, 2,4-di-tert-butylphenyl-3,5-di-tert-butyl-4-hydroxybenzoate, 2-ethylhexyl-2-cyano-3,3-diphenylacrylate, 1,3-bis(4-benzoyl-3-hydroxyphenoxy)-2-propyl acrylate, 1,3-bis(4-benzoyl-3-hydroxyphenoxy)-2-propyl methacrylate, 2-hydroxy-4-methoxybenzophenone-5-sulfonic acid, o-benzoyl-benzoic acid methyl ester, ethyl 2-cyano-3,3-diphenyl acrylate, 2-hydroxy-4-benzyloxybenzophenone, dibutyldithiocarbamic acid nickel, nickel bisphenol complex, nickel containing organic light stabilizers, organic or inorganic complex containing barium, sodium and phosphorus, semicarbazone based light stabilizers, zinc oxide based UV stabilizers or synergist known as Trade Mark, Sanshade, bis(2,2,6,6-tetramethyl-4-piperidyl) sebacate, bis(1,2,2,6,6-pentamethyl-4-piperidyl)sebacate, 1-[2-{3-(3,5-di-tert-butyl-4-hydroxyphenyl)-propionyloxy}-ethyl]-4-{3-(3,5-di-tert-butyl-4-hydroxyphenyl)-propionyloxy}-2,2,6,6-tetramethyl-piperidine, 8-benzyl-7,7,9,9-tetramethyl-3-octyl-1,2,3-triazaspiro[4,5]undecane-2,4-dione, 4-benzoyloxy-2,2,6,6-tetramethylpiperidine, polycondensate of succinic acid dimethyl ester and 1-(2-hydroxyethyl)-4-hydroxy-2,2,6,6-tetramethylpiperidine, poly[6-(1,1,3,3-tetramethylbutyl) imino-1,3,5-triazine-2,4-diyl]-[(2,2,6,6-tetramethyl-4-piperidyl)imino]hexamethylene[(2,2,6,6-tetramethyl-4-piperidyl)imino], 2-(3,5-di-tert-butyl-4-hydroxybenzyl)-2-n-butylmalonic aicd bis(1,2,2,6,6-pentamethyl-4-piperidyl), tetrakis(2,2,6,6-tetramethyl-4-piperidyl)-1,2,3,4-butanetetracarboxylate, condensation product of 1,2,3,4-butanetetra-carboxylic acid with 1,2,2,6,6-pentamethyl-4-piperidinol and tridecyl alcohol, condensation product of 1,2,3,4-butanetetracarboxylic acid with 2,2,6,6-tetramethyl-4-piperidinol and tridecyl alcohol, condensation product of 1,2,3,4-butanetetracarboxylic acid with 1,2,2,6,6-pentamethyl-4-piperidinol and β,β,β',β'-tetramethyl-3,9-(2,4,8,10-tetraoxaspiro[5,5]undecane) diethanol, condensation product of 1,2,3,4-butanetetracarboxylic acid with 2,2,6,6-tetramethyl-4-piperidinol and β,β,β',β'-tetramethyl-3,9-(2,4,8,10-tetraoxaspiro[5,5]undecane)diethanol, and hindered amines such as 1,2,2,6,6-pentamethyl-4-piperidyl methacrylate and 2,2,6,6-tetramethyl-4-piperidiyl methacrylate.

The content of UV-absorbers and light stabilizers effects weatherability and transparency of the film obtained. When the content of UV-absorbers or light stabilizers is high, transparency which is originally present in the lactic acid based polymer is unfavorably lowered. When the content is low, the effect for inhibiting decomposition of the film under tension becomes unfavorably reduced. Under these circumstances, the content of UV-absorbers and light stabilizers is preferably 0.001–5 parts by weight, more preferably 0.01–2 parts by weight for 100 parts by weight of the lactic acid based polymer.

EXAMPLE

The invention will hereinafter be illustrated further in detail by way of examples. However, these examples are described to understand the invention more clearly and not to limit the scope of the invention.

Properties illustrated in the examples were measured by the following methods.

(1) Surface Specific Resistance($\Omega$)

Specific resistance meter, Model TR-8601 (manufactured by Takeda Riken Co.) was used in the atmosphere of 23° C. and room humidity of 40%. 500 voltage was applied and surface specific resistance was measured after one minute.

(2) Half-life (see) of Electrostatic Charge

Continuous tester of static electricity, Model EVL-3R (manufactured by Simco Co. Inc.) was used and measured in the atmosphere room humidity of 40%.

(3) Immediate Activity of Antistatic Effect($\Omega$ or sec.)

A film sample was prepared and allowed to stand in the room. Surface specific resistance was measured after 1 day and 7 days by the method (1). Half-life of electrostatic charge was measured by the method (2).

(4) Durability of Antistatic Effect($\Omega$)

A film sample was prepared and allowed to stand in the room.

Specific surface resistance was measured after 6 months and a year by the method (1).

(5) Uniformity of Antistatic Effect($\Omega$)

A film sample was prepared. Sampling was carried out so as to take 5 samples in the machine direction at 50 cm width, and 5 samples in the transverse direction at 30 cm width, thus 5×5=25 samples were prepared. Surface resistance was measured by the method (1) and is shown by dispersion (R=minimum-maximum).

(6) Transparency of Film (Haze, %)

Measured in accordance with ASTM D-1003 by using Direct Reading Haze Meter; Model No. 206, manufactured by Toyo Seiki Ind. Co.

(7) Blocking Resistance

A roll of sample film was cut into a width of 30 cm. A load (g) for separating the film from the roll was measured and divided into the following three classes.

○: 0–50 g

Δ: 50–200 g x: exceeding 200 g (8) Measurement of Coefficient on Membrane Thickness Variation Terminal portion was removed to the direction of width. The film used for the sample had membranes on the surface and 1100 mm width.

Ten measuring points are made at the interval of 100 mm in the direction of sample width. Similar treatment was repeated three times at the interval of 10 mm in the direction of film length to determine 30 measuring points as a whole.

Each measuring point was cut out in the form of a small piece. The cut section of each piece was observed with a transmission type electron microscope, Model JEM-2010 (manufactured by Nippon Densi Kogyo Co.) under magnification of 10,000 times to measure thickness of the membrane. Average value (X) and standard deviation ($\delta$) was used for calculating coefficient of membrane thickness deviation (CV) according to the following equation.

$CV(\%)=(\delta/X) \times 100$ (9) (Weight Average Molecular Weight (Mw))

Aliphatic polyester was dissolved in chloroform and molecular weight was measured by gel permeation chromatography polystyrene as a reference.

(10) Adhesion of Anticlouding Membrane

A house having a one slope roof, frontage of 1 m, depth of 5 m, ridge height of 1.3 m and roof gradient of 30 degrees was covered with a film so as to make the membrane inside of the film. After 10 days, one month 6 months and 12 months, a cellophane tape was adhered to the membrane. When the cellophane tape was separated, peeling appearance of the membrane was observed with naked eyes. The results are evaluated according to the following standard.

4: Membrane was not peeled at all, and completely remained.

3: ⅔ or more membrane was not peeled and remained.

2: ⅔ or more membrane was peeled.

1: Membrane was completely peeled off.

Example 1-1

A cationic antistatic agent; ELECTROSTRIPPER QN having an effective ingredient concentration of 30% by weight (manufactured by Kao Co.) was diluted with water to obtain aqueous coating liquid A having a concentration of 0.1% by weight. Successively, 100 parts by weight of poly(L-lactic acid) having a weight average molecular weight of about 120,000 (hereinafter referred to simply as polymer ①) was mixed with 0.15 part by weight of montan ester based lubricant; HOSTALUB WE-4 (manufactured by Hoechst Japan Co.) and pelletized. The pellet thus obtained was dried and heat-treated in an oven at 80° C. to crystallize the polymer. The crystallized pellet was extruded with a T-die mounted single-screw extruder at 150–200° C. and cooled on a casting roll at 30° C. The unstretched film thus obtained had an average thickness of 400 $\mu$m. The unstretched film was stretched with a hot roll at 60° C. in the machine direction at the magnification of 2.5 times. Successively, the above aqueous coating liquid A was coated on both surfaces of the film with metering bar coating method. The coated film was dried at 70° C. in the tenter. Thereafter the film was stretched in the tenter at 70° C. in the transverse direction at a magnification of 2.5 times. The film was further heat set at 130° C. for 30 seconds under tension to obtain a biaxially stretched and coated film having an average thickness of 100 $\mu$m. Each coated membrane on the film had a thickness of 0.1 $\mu$m.

Example 1-2

A nonionic antistatic agent; DENON 733 having an effective ingredient concentration of 100% by weight (manufactured by Marubishi Yuka Kogyo Co.) was diluted with water to obtain aqueous coating liquid B having a concentration of 1% by weight. Polybutylene succinate was obtained by dehydration polycondensation of succinic acid and 1,4-butanediol. Successively, 80% by weight of polymer ① was reacted with 20% by weight of polybutylene succinate having a weight average molecular weight of about 100,000 to obtain a block copolymer (hereinafter referred to simply as polymer ②). To 100 parts by weight of polymer ②, 0.5 part by weight of aliphatic amide base lubricant; SLIPACKS E (manufactured by Nippon Kasei Co.) was added and pelletized. The pellet was dried and heat-treated in an oven at 80° C. to crystallize the polymer. The crystallized pellet was extruded with a T-die mounted single-screw extruder at 150–200° C., and cooled on a casting roll at 30° C. to obtain an unstretched film having an average thickness of 400 $\mu$m. The unstretched film was stretched in the machine direction with a hot roll at 40° C. at the magnification of 2.5 times. Thereafter the above aqueous coating liquid B was coated by metering bar coating method in both surfaces of the film, and dried in the tenter at 50° C. Successively, thus obtained film was stretched in the tenter at 50° C. in the transverse direction at the magnification of 2.5 times and subjected to heat set under tension at 120° C. for 30 seconds. The biaxially stretched and coated film thus obtained had an average thickness of 100 µm. Each coated membrane of the film had a thickness of 0.3 µm.

Example 1-3

A betaine antistatic agent; ELECTROSTRIPPER AC having an effective ingredient concentration of 25% by weight (manufactured by Kao Co.) was diluted with water to obtain aqueous coating liquid C having a concentration of 0.15% by weight. Stearic acid; STEARIC ACID #100 (manufactured by Shin Nippon Rica Co.) was used as lubricant. To 100 parts by weight of polymer ①, 1.0 part by weight of STEARIC ACID #100 was added and pelletized. The pellet was dried and heat-treated in an oven at 80° C. to crystallize the polymer. The crystallized pellet was extruded with a T-die mounted single screw extruder at 150–200° C. and cooled on a casting roll at 30° C. to obtain an unstretched film having an average thickness of 400 µm. The unstretched film was stretched in the machine direction with a hot roll at 60° C. at the magnification of 2.5 times. Thereafter, the above aqueous coating liquid C was coated by metering bar coating method on both surfaces of the film, and dried in the tenter at 70° C. Successively, thus obtained film was stretched in the tenter at 70° C. in the transverse direction at the magnification of 2.5 times and subjected to heat set under tension at 130° C. for 30 seconds. The biaxially stretched and coated film thus obtained had an average thickness of 100 µm. Each coated membrane of the film had a thickness of 0.2 µm.

Example 1-4

A biaxially stretched and coated film was prepared by carrying out the same procedures as described in Example 1-1 except that the lubricant was replaced by 0.5 part by weight of silica as antiblocking agent; AEROSIL 200 (manufactured by Nippon Aerosil Co.). Each membrane on the film had a thickness of 0.1 µm.

Example 1-5

The unstretched film obtained in Example 1-1 was coated on both surfaces of the film with the above coating liquid A by metering bar coating method, passed through a drying oven at 60° C. for 5 minutes, and wound up to obtain an unstretched film having an antistatic layer. Each membrane on the film had a thickness of 0.2 µm.

Example 1-6

A biaxially stretched film having an antistatic layer was obtained by carrying out the same procedures as Example 1-1 except that the concentration of the aqueous coating liquid A was changed to 10% by weight (hereinafter referred to as aqueous coating liquid D). Each membrane of the film had a thickness of 0.6 µm.

Example 1-7

A biaxially stretched film having an antistatic layer was obtained by carrying out the same procedures as Example 1-1 except that the concentration of the aqueous coating liquid A was changed to 20% by weight (hereinafter referred to as aqueous coating liquid E). Each membrane of the film had a thickness of 1.0 µm.

Example 1-8

A biaxially stretched film having an antistatic layer was obtained by carrying out the same procedures as Example 1-1 except that polybutylene succiante having a weight average molecular weight of about 100,000 (hereinafter referred to as polymer ③) was used. Each membrane on the film had a thickness of 0.1 µm.

Comparative Example 1-1

A biaxially stretched film having a kneaded-in antistatic agent was obtained by carrying out the same procedures as Example 1-1 except that 3 parts by weight of the cationic antistatic agent (ELECTROSTRIPPER QN) was added and kneaded to 100 parts by weight of polymer ①, and the aqueous coating liquid which contained antistatic agent was not coated on the film surface.

Comparative Example 1-2

A biaxially stretched film having a kneaded-in antistatic agent and lubricant was obtained by carrying out the same procedures as Example 1-2 except that 5 parts by weight of the antistatic agent (DENON 733) and 0.5 part by weight of the lubricant (SLIPACKS E) was added and kneaded to 100 parts by weight of the polymer ② and the aqueous coating liquid which contained antistatic agent was not coated on the surface of the film.

Comparative Example 1-3

A biaxially stretched and coated film was prepared by carrying out the same procedures as Example 1-3 except that the amount of lubricant was changed to 0.05 part by weight. Each membrane on the film had a thickness of 0.2 µm.

Comparative Example 1-4

A biaxially stretched and coated film was prepared by carrying out the same procedures as Example 1-1 except that the amount of lubricant was changed to 2.5 parts by weight. Each membrane on the film had a thickness of 0.1 µm.

The films obtained in the above examples and comparative examples were measured their properties by the above methods and results are illustrated in Table 1.

As shown in Table 1, the non-charged aliphatic polyester film of the invention has low surface resistance and thus has a satisfactory antistatic effect. Even after one day from the preparation of film of the invention, sufficient antistatic property was shown and its immediate effect was proved. The non-charged aliphatic polyester film of the invention has an uniformity and small dispersion of surface resistance on the film and a coefficient on membrane thickness variation of 130% or less. As the result, the surface resistance was maintained even after 6 months and one year, and proved excellent durability of the antistatic effect.

TABLE 1

| | | EXAMPLE | | | | | |
|---|---|---|---|---|---|---|---|
| | | 1-1 | 1-2 | 1-3 | 1-4 | 1-5 | 1-6 |
| Polymer | | ① | ② | ① | ① | ① | ① |
| Antistatic agent | | Cation Type | Nonion Type | Betaine Type | Cation Type | Cation Type | Cation Type |
| | Addition Method | Coating | Coating | Coating | Coating | Coating | Coating |
| | Coating Liquid | A | B | C | A | A | D |
| | Concentration | 0.1 | 1.0 | 0.15 | 0.1 | 0.1 | 10 |
| Lubricant or Antiblocking Agent | | montan ester | bisamide | stearic acid | silica | montan ester | montan ester |
| | Parts by Weight | 0.15 | 0.5 | 1.0 | 0.5 | 0.15 | 0.15 |
| Surface | After 1 day | $2 \times 10^{10}$ | $3 \times 10^{10}$ | $1 \times 10^{10}$ | $2 \times 10^{10}$ | $2 \times 10^{10}$ | $2 \times 10^{10}$ |
| Resistance | After 7 days | $1 \times 10^{10}$ | $2 \times 10^{10}$ | $1 \times 10^{10}$ | $3 \times 10^{10}$ | $2 \times 10^{10}$ | $2 \times 10^{10}$ |
| ($\Omega$) | After 6 months | $3 \times 10^{10}$ | $4 \times 10^{10}$ | $2 \times 10^{10}$ | $2 \times 10^{10}$ | $3 \times 10^{10}$ | $2 \times 10^{10}$ |
| | After 1 year | $2 \times 10^{10}$ | $3 \times 10^{10}$ | $1 \times 10^{10}$ | $2 \times 10^{10}$ | $3 \times 10^{10}$ | $1 \times 10^{10}$ |
| Half-life of | After 1 day | 1 | 1 | 1 | 1 | 1 | 1 |
| Charge (sec) | After 7 days | 1 | 1 | 1 | 1 | 1 | 1 |
| Uniformity of | average | $2 \times 10^{10}$ | $3 \times 10^{10}$ | $1 \times 10^{10}$ | $2 \times 10^{10}$ | $2 \times 10^{10}$ | $2 \times 10^{10}$ |
| Resistance | R | $2 \times 10^{9}$ ~ | $8 \times 10^{9}$ ~ | $7 \times 10^{9}$ ~ | $7 \times 10^{9}$ ~ | $6 \times 10^{9}$ ~ | $7 \times 10^{9}$ ~ |
| ($\Omega$) | | $5 \times 10^{10}$ | $7 \times 10^{10}$ | $4 \times 10^{10}$ | $5 \times 10^{10}$ | $5 \times 10^{10}$ | $6 \times 10^{10}$ |
| Haze (%) | | 1> | 1> | 1> | 1> | 1> | 1> |
| Blocking Resistance | | ○ | ○ | ○ | ○ | ○ | ○ |
| CV (%) | | 100 | 80 | 50 | 120 | 90 | 70 |

| | | EXAMPLE | | COMPARATIVE EXAMPLE | | | |
|---|---|---|---|---|---|---|---|
| | | 1-7 | 1-8 | 1-1 | 1-2 | 1-3 | 1-4 |
| Polymer | | ① | ③ | ① | ② | ① | ① |
| Antistatic agent | | Cation Type | Cation Type | Cation Type | Nonion Type | Betaine Type | Cation Type |
| | Addition Method | Coating | Coating | Kneading | Kneading | Coating | Coating |
| | Coating Liquid | E | A | — | — | C | A |
| | Concentration | 20 | 0.1 | — | — | 0.15 | 0.1 |
| Lubricant or Antiblocking Agent | | montan ester | montan ester | — | bisamide | stearic acid | montan ester |
| | Parts by Weight | 0.15 | 0.15 | — | 0.5 | 0.05 | 2.5 |
| Surface | After 1 day | $2 \times 10^{10}$ | $2 \times 10^{10}$ | $>10^{16}$ | $>10^{16}$ | $1 \times 10^{10}$ | $2 \times 10^{10}$ |
| Resistance | After 7 days | $2 \times 10^{10}$ | $2 \times 10^{10}$ | $>10^{16}$ | $5 \times 10^{12}$ | $2 \times 10^{10}$ | $3 \times 10^{10}$ |
| ($\Omega$) | After 6 months | $2 \times 10^{10}$ | $1 \times 10^{10}$ | $>10^{16}$ | $7 \times 10^{15}$ | $2 \times 10^{11}$ | $2 \times 10^{11}$ |
| | After 1 year | $1 \times 10^{10}$ | $2 \times 10^{10}$ | $>10^{16}$ | $>10^{16}$ | $8 \times 10^{12}$ | $7 \times 10^{12}$ |
| Half-life of | After 1 day | 1 | 1 | >30 | >30 | 1 | 1 |
| Charge (sec) | After 7 days | 1 | 1 | >30 | 10 | 1 | 1 |
| Uniformity of | average | $2 \times 10^{10}$ | $2 \times 10^{10}$ | $>10^{16}$ | $>10^{16}$ | $1 \times 10^{10}$ | $2 \times 10^{10}$ |
| Resistance | R | $8 \times 10^{9}$ ~ | $7 \times 10^{9}$ ~ | — | — | $7 \times 10^{8}$ ~ | $8 \times 10^{8}$ ~ |
| ($\Omega$) | | $5 \times 10^{10}$ | $6 \times 10^{10}$ | | | $4 \times 10^{11}$ | $3 \times 10^{11}$ |
| Haze (%) | | 1> | 1> | 1> | 1> | 1> | 2.7 |
| Blocking Resistance | | ○ | ○ | ○ | ○ | ○ | ○ |
| CV (%) | | 120 | 120 | — | — | 190 | 150 |

Preparation Examples 1-3 of Anticlouding Composition

To a four necked flask, 2 parts by weight of polyoxyethylene lauryl ether and 80 parts by weight of water were charged and heated to 60° C. with stirring in a nitrogen gas atmosphere and 0.5 part by weight of ammonium persulfate was dropwise added. Further, 100 parts by weight of monomer mixture comprising 60% by mol of methyl methacrylate and 40% by mol of n-butyl methacrylate was dropwise added over 3 hours. After finishing dropwise addition, the mixture was maintained at 60–70° C. for 2 hours and cooled. The reaction mixture was neutralized with aqueous ammonia to obtain acrylic based resin emulsion.

Acrylic based resin emulsion thus obtained was mixed with inorganic colloid sol to obtain anticlouding agent compositions A, B and C. The amount and kind of the inorganic resin composition are illustrated in Table 2.

TABLE 2

| | | Anticlouding Composition | | |
|---|---|---|---|---|
| | | Preparation Example 1 A | Preparation Example 2 B | Preparation Example 3 C |
| Acrylic based resin emulsion (dry base) | (parts by weight) | 2.5 | 1.5 | 2.5 |
| Silica sol *1 | (parts by weight) | 2.5 | 0 | 1.5 |
| Alumina sol *2 | (parts by weight) | 0 | 3.5 | 1.0 |
| Water | (parts by weight) | 95 | 95 | 95 |

Note:
*1: Silica sol (SNOWTEX D manufactured by Nissan Chem. Co.)
*2: Alumina sol (Alumina sol 520 manufactured by Nissan Chem. Co.)

Example 2-1

To 100 parts by weight of poly(L-lactic acid) having a weight average molecular weight of about 120,000 and a melting point of 175° C. (hereinafter referred to as PLA), 0.05 part by weight of UV absorber; VIOSORB 130 (manufactured by Kyodo Yakuhin Co.) and 0.3 part by weight of fatty acid ester based lubricant; HOSTALUB WE-4 (manufactured by Hoechst Japan Co.) were added and pelletized. The pellet was kneaded, melted and extruded at 180° C. with a T-die mounted extruder to obtain an unstretched film having a thickness of 800 μm. The unstretched film was heated to 60° C. and stretched with roll method in machine direction at the magnification of 3 times to obtain a uniaxially stretched film. One surface of the film was subjected to corona discharge treatment. The anticlouding composition A obtained in the Preparation Example 1 was coated on the corona treated surface by metering bar coating method in an amount shown in Table 3. The coated film was heated to 70° C. and stretched with a tenter in the transverse direction at the magnification of 2.5 times. Successively, subjected to heat treatment under tension at 140° C. for 2 minutes to obtain biaxially stretched film having an anticlouding membrane of 0.1 mm in thickness. Adhesion of the anticlouding membrane and transparency of the film obtained were measured by the above method. Table 3 illustrates amount of lubricant (parts by weight), weight of anticlouding membrane per unit area and adhesion of anticlouding membrane.

Example 2-2

A copolymer was prepared by reacting 90% by weight of PLA used in Example 2-1 and 10% by weight polybutylene succinate having a weight average molecular weight of about 100,000.

To 100 parts by weight of the copolymer, 0.05 part by weight of UV absorber; VIOSORB 130 and 1.0 part by weight of fatty acid ester based lubricant; HOSTALUB WE-4 were added and pelletized. The pellet was kneaded, melted and extruded at 180° C. with a T-die mounted extruder to obtain an unstretched film having a thickness of 800 μm. The unstretched film was heated to 40° C. and stretched with a roll method in the machine direction at the magnification of 3 times to obtain an uniaxially stretched film. Corona discharge treatment was carried out on one surface of the film. The non clouding composition A obtained in the Preparation Example 1 was coated on the treated surface in an amount shown in Table 3 with metering bar coating method. Thereafter, the film was heated to 50° C. and stretched with a tenter in the transverse direction at the magnification of 2.5 times. Successively, the film was heat treated at 120° C. under tension for 2 minutes to obtain a biaxially stretched film having anticlouding membrane of 0.1 mm in thickness. Adhesion of the anticlouding membrane and transparency of the film obtained were measured by the above method. Table 3 illustrates amount of lubricant (parts by weight), weight of anticlouding membrane per unit area and adhesion of anticlouding membrane.

Example 2-3

A biaxially stretched film having anticlouding membrane was prepared by carrying out the same procedures as Example 2-1 except that the lubricant used in Example 2-1 was replaced by 0.5 part by weight of a fatty acid based lubricant: F-3 (manufactured by Kawaken Fine Chemical Co.), and amount of the anticlouding membrane per unit area was changed.

The film thus obtained was evaluated by the same method as Example 2-1. Amount of the lubricant and evaluation results are shown in Table 3.

Example 2-4

A biaxially stretched film having anticlouding membrane was prepared by carrying out the same procedures as Example 2-1 except that the lubricant used in Example 2-1 was replaced by 0.5 part by weight of a fatty acid amide-base lubricant: DIAMID 200 (manufactured by Nippon Kasei Co.), and the amount of anticlouding membrane per unit area was changed. The film thus obtained was evaluated by the same method as Example 2-1. The amount of the lubricant and evaluation results are shown in Table 3.

Example 2-5

A biaxially stretched film having anticlouding membrane was prepared by carrying out the same procedures as Example 2-1 except that the anticlouding composition used in Example 2-1 was replaced by the anticlouding composition B. The film obtained was evaluated by the same method as Example 2-1. Amount of the lubricant and evaluation results are shown in Table 3.

Example 2-6

A biaxially stretched film having anticlouding membrane was prepared by carrying out the same procedures as Example 2-1 except that the anticlouding composition used in Example 2-1 was replaced by the anticlouding composition C and the amount of the anticlouding membrane per unit area was changed. The film obtained was evaluated by the same method as Example 2-1. Amount of the lubricant and evaluation results are shown in Table 3.

Example 2-7

To 100 parts by weight of PLA, 0.05 part by weight of an UV absorber: VIOSORB 130 and 0.3 part by weight of a fatty acid ester based lubricant: HOSTALUB WE-4 were added and pelletized. The pellet was kneaded, melted and extruded at 180° C. with a T-die mounted extruder to obtain an unstretched film having a thickness of 100 μm.

One surface of the film obtained was treated with corona discharge. The anticlouding composition A was coated on the corona treated surface of the film by metering bar coating method so as to make the amount of the anticlouding membrane per unit area in Table 3. The coated film obtained was evaluated by the same method as Example 2-1. Amount of lubricant and evaluation results are illustrated in Table 3.

Example 2-8

A biaxially stretched film having anticlouding membrane was prepared by carrying out the same procedures as Example 2-1 except that polybutylene succinate having a molecular weight of 100,000 was used, wherein polybutylene succinate was obtained by dehydration polycondensation of succinic acid and 1,4-butanediol. The biaxially stretched film was evaluated by the same method as Example 2-1 and results are illustrated in Table 3.

Comparative Example 2-1–2-4

A biaxially stretched film having anticlouding membrane was prepared by carrying out the same procedures as Example 2-1 except that the pellet was blended with the lubricant in parts by weight shown in Table 3 and that the weight of the anticlouding membrane per unit area is shown in Table 3. The film was evaluated by the same method as Example 2-1. The amount of lubricant and evaluation results are shown in Table 3.

As shown in Table 3, the anticlouding aliphatic polyester film of the invention is excellent in adhesion of anticlouding membrane. The anticlouding aliphatic polyester film of the invention has an uniformity in thickness of the anticlouding membrane and a coefficient on membrane thickness variation of 130% or less. As the result, the anticlouding property was maintained even after 6 months and one year, and proved excellent durability of the anticlouding effect.

TABLE 3

|  | Lubricant (parts) | Membrane Weight (g/m²) | Anticlouding Composition | Adhesion of anticlouding composition | | | | Haze (%) | CV (%) |
| --- | --- | --- | --- | --- | --- | --- | --- | --- | --- |
|  |  |  |  | 10 days | 1 month | 6 months | 12 months |  |  |
| Example |  |  |  |  |  |  |  |  |  |
| 2-1 | 0.3 | 0.5 | A | 4 | 4 | 4 | 4 | 1> | 100 |
| 2-2 | 1.0 | 0.5 | A | 4 | 4 | 4 | 4 | 1> | 110 |
| 2-3 | 0.5 | 0.25 | A | 4 | 4 | 4 | 4 | 1> | 120 |
| 2-4 | 0.5 | 2.0 | A | 4 | 4 | 4 | 4 | 1> | 120 |
| 2-5 | 0.3 | 0.5 | B | 4 | 4 | 4 | 4 | 1> | 110 |
| 2-6 | 0.3 | 3.0 | C | 4 | 4 | 4 | 4 | 1> | 90 |
| 2-7 | 0.3 | 1.0 | A | 4 | 4 | 4 | 4 | 1> | 80 |
| 2-8 | 0.3 | 0.5 | A | 4 | 4 | 4 | 3 | 18 | 120 |
| Comparative Example |  |  |  |  |  |  |  |  |  |
| 2-1 | 0.05 | 0.5 | A | 3 | 3 | 2 | 2 | 1> | 250 |
| 2-2 | 3.0 | 0.5 | A | membrane forming impossible | | | | — | — |
| 2-3 | 0.3 | 0.01 | A | * | — | — | — | — | — |
| 2-4 | 0.3 | 7.0 | A | 3 | 3 | 2 | 1 | 2.5 | 340 |

Note: *: Uniform membrane could not be formed on the film surface.

What is claimed is:

1. A coated aliphatic polyester film having a membrane having a thickness of 0.05–1 μm and coefficient of thickness variation of 130% or less and formed by coating an aqueous coating liquid comprised of an anticlouding agent on one or more surfaces of an aliphatic polyester film composed of an aliphatic polyester resin composition comprising 0.1–2 parts by weight of one or more additives selected from the group consisting of a lubricant and silica having an average particle size of 7 to 50 nm for 100 parts by weight of aliphatic polyester.

2. The coated aliphatic polyester film according to claim 1, wherein the aliphatic polyester is a lactic acid based polyester.

3. The coated aliphatic polyester film according to claim 2, wherein the membrane is an anticlouding layer and the coated aliphatic polyester film is an anticlouding agricultural aliphatic polyester film.

4. The coated aliphatic polyester film according to claim 3, wherein the anticlouding layer is formed by coating a hydrophilic coating liquid primarily comprised of inorganic colloid sol and binder, and the weight of solid portion of the anticlouding layer per unit area is 0.01–5 g/m².

5. The coated aliphatic polyester film according to claim 4, wherein the inorganic colloid sol is one or more compounds selected from the group consisting of silica sol and alumina sol.

6. The coated aliphatic polyester film according to claim 4, wherein the aliphatic polyester film is a biaxially stretched film obtained by stretching to the machine direction at the magnification of 1.3–5 times and to the transverse direction at the magnification of

* * * * *

UNITED STATES PATENT AND TRADEMARK OFFICE
CERTIFICATE OF CORRECTION

PATENT NO.    : 6,139,948
DATED         : October 31, 2000
INVENTOR(S)   : Naoki Kobayashi, Shuhei Ikado, Akira Kawano, Takayuki Kuroki and Hirotaka Wanibe Page 1 of 1

It is certified that error appears in the above-identified patent and that said Letters Patent is hereby corrected as shown below:

<u>Claim 6,</u>
Line 2, the reference to claim numeral "4" should read -- 3 --;
Line 5, the last part of the claim was left off and "1.3 - 5 times." should be added to the end.

Signed and Sealed this

Sixteenth Day of April, 2002

Attest:

Attesting Officer

JAMES E. ROGAN
*Director of the United States Patent and Trademark Office*